US012673594B2

(12) United States Patent　　　(10) Patent No.: US 12,673,594 B2
　　　Subat et al.　　　　　　　　　　　　(45) Date of Patent:　　Jul. 7, 2026

(54) ACOUSTIC HEADREST WITH ADJUSTABLE SURFACE

(71) Applicant: Bose Corporation, Framingham, MA (US)

(72) Inventors: Bradford Kyle Subat, Northborough, MA (US); Nicholas K. Lade, Waltham, MA (US)

(73) Assignee: Bose Corporation, Framingham, MA (US)

( * ) Notice: Subject to any disclaimer, the term of this patent is extended or adjusted under 35 U.S.C. 154(b) by 174 days.

(21) Appl. No.: 18/267,662

(22) PCT Filed: Dec. 22, 2021

(86) PCT No.: PCT/US2021/064944

§ 371 (c)(1),
(2) Date: Jun. 15, 2023

(87) PCT Pub. No.: WO2022/140597

PCT Pub. Date: Jun. 30, 2022

(65) Prior Publication Data

US 2024/0051448 A1　　Feb. 15, 2024

Related U.S. Application Data

(60) Provisional application No. 63/130,211, filed on Dec. 23, 2020.

(51) Int. Cl.
　　*H04R 1/02*　　　　(2006.01)
　　*B60N 2/809*　　　(2018.01)
　　　　(Continued)

(52) U.S. Cl.
CPC ............. *B60N 2/879* (2018.02); *B60N 2/809* (2018.02); *B60N 2/865* (2018.02); *H04R 1/025* (2013.01); *H04R 2499/13* (2013.01)

(58) Field of Classification Search
CPC ........ B60N 2/879; B60N 2/809; B60N 2/865; H04R 1/025; H04R 2499/13
See application file for complete search history.

(56) References Cited

U.S. PATENT DOCUMENTS 6,744,898 B1　6/2004　Hirano
2004/0144817 A1　7/2004　Albert
　　　　(Continued)

FOREIGN PATENT DOCUMENTS

CN　　　109070782 A　　12/2018

OTHER PUBLICATIONS

First Office Action issued in CN Application. No. 202180086636.0, mailed Jun. 30, 2025, 18 pages.

*Primary Examiner* — Jason R Kurr

(57)　　　ABSTRACT

Systems and methods of providing audio through or near a headrest are provided. A headrest includes an adjustable surface positioned to be proximate an occupants head when in use and an acoustic opening is configured to emit acoustic energy from an acoustic transducer in a range of directions in which an ear of the occupant is expected to occupy. The position of the adjustable surface gives some indication of the location of the occupants ear, and various audio signal (driver signal) properties may be adjusted based upon the position of the adjustable surface.

13 Claims, 12 Drawing Sheets

(51) Int. Cl.
    B60N 2/865         (2018.01)
    B60N 2/879         (2018.01)

(56)               References Cited

U.S. PATENT DOCUMENTS

2018/0056832 A1 *  3/2018  Oswald ................. B60N 2/885
2019/0232840 A1 *  8/2019  Close .................... B60N 2/885
2020/0404422 A1 * 12/2020  Lopez Zuleta ........ B60N 2/879

* cited by examiner

ACOUSTIC HEADREST WITH ADJUSTABLE SURFACE

CROSS REFERENCE TO RELATED APPLICATIONS

This application claims the priority to U.S. Patent Application Ser. No. 63/130,211, filed on Dec. 23, 2020, titled "ACOUSTIC HEADREST WITH ADJUSTABLE SURFACE" the content of which is incorporated herein in its entirety for all purposes.

BACKGROUND

Various seating systems, such as automobiles, amusement rides, trains, and the like, may be provided with audio system components, e.g., speakers, in or proximate to a headrest portion of the seat to provide audio functionality to an occupant of the seat.

SUMMARY

Systems and methods disclosed herein are directed to headrest(s) configured to accommodate at least one acoustic transducer. The headrest includes a surface configured to be adjacent a user or occupant's head and to arrest or restrain movement of the user's head in case of, e.g., a rapid acceleration. The surface is further configured to be adjustable, e.g., moveable, in at least one and preferably two dimensions, such as forward-and-back as well as up-and-down, relative to a typical seating position or arrangement.

Systems and methods of providing audio through or near a headrest are provided. A headrest includes an adjustable surface positioned to be proximate an occupant's head when in use and an acoustic opening is configured to emit acoustic energy from an acoustic transducer in a range of directions in which an ear of the occupant is expected to occupy. The position of the adjustable surface gives some indication of the location of the occupant's ear, and various audio signal (driver signal) properties may be adjusted based upon the position of the adjustable surface.

According to at least one aspect, a headrest is provided that includes an adjustable surface positioned to be proximate an occupant's head when in use, and an acoustic opening configured to emit acoustic energy from an acoustic transducer in a range of directions in which an ear of the occupant is expected to occupy.

In various examples, a processor may be configured to adjust a driver signal provided to the acoustic transducer based on a position of the adjustable surface. The processor may be located elsewhere and coupled to the headrest.

Some examples include a sensor configured to detect the position of the adjustable surface.

In certain examples, the processor may be configured to adjust the driver signal to compensate at least in part for a shadow region between the acoustic opening and the ear, the shadow region varying with the position of the adjustable surface.

According to various examples, the adjustable surface may be adjustable in a horizontal dimension, a vertical dimension, or both.

Various examples may include an acoustic conduit that adjusts a shape of an acoustic channel in relation to movement of the adjustable surface. A processor may be configured to adjust a driver signal provided to the acoustic transducer based on a position of the adjustable surface to compensate at least in part for varying acoustic properties of the acoustic conduit based upon the position of the adjustable surface.

Some examples include the acoustic transducer.

According to another aspect, an audio system is provided that includes a headrest having an adjustable surface positioned to be proximate an occupant's head when in use, an acoustic opening configured to emit acoustic energy from an acoustic transducer in a range of directions in which an ear of the occupant is expected to occupy, and a processor configured to adjust a driver signal provided to the acoustic transducer based on a position of the adjustable surface.

Various examples include a sensor configured to detect the position of the adjustable surface.

In certain examples, the processor may be configured to adjust the driver signal to compensate at least in part for a shadow region between the acoustic opening and the ear, the shadow region varying with the position of the adjustable surface.

According to some examples, the adjustable surface is adjustable in a horizontal dimension, a vertical dimension, or both.

Certain examples may include an acoustic conduit that adjusts a shape of an acoustic channel in relation to movement of the adjustable surface. In such examples, the processor may be configured to adjust the driver signal to compensate at least in part for varying acoustic properties of the acoustic conduit based upon the position of the adjustable surface.

According to yet another aspect, a method of controlling an audio output of an audio headrest having an adjustable surface is provided. The method includes detecting a position of the adjustable surface of the headrest and adjusting a driver signal provided to an acoustic transducer based on the detected position of the adjustable surface.

In some examples adjusting the driver signal compensates at least in part for a shadow region between the acoustic opening and the ear, the shadow region varying with the position of the adjustable surface.

In various examples adjusting the driver signal compensates at least in part for varying acoustic properties of an acoustic conduit based upon the position of the adjustable surface.

According to various examples, the adjustable surface may be adjustable in a horizontal dimension, a vertical dimension, or both.

Still other aspects, examples, and advantages of these exemplary aspects and examples are discussed in detail below. Examples disclosed herein may be combined with other examples in any manner consistent with at least one of the principles disclosed herein, and references to "an example," "some examples," "an alternate example," "various examples," "one example" or the like are not necessarily mutually exclusive and are intended to indicate that a particular feature, structure, or characteristic described may be included in at least one example. The appearances of such terms herein are not necessarily all referring to the same example.

BRIEF DESCRIPTION OF THE DRAWINGS

Various aspects of at least one example are discussed below with reference to the accompanying figures, which are not intended to be drawn to scale. The figures are included to provide illustration and a further understanding of the various aspects and examples and are incorporated in and constitute a part of this specification but are not intended as a definition of the limits of the invention(s). In the figures, identical or nearly identical components illustrated in various figures may be represented by a like reference character or numeral. For purposes of clarity, not every component may be labeled in every figure. In the figures.

DETAILED DESCRIPTION

Figure 1:
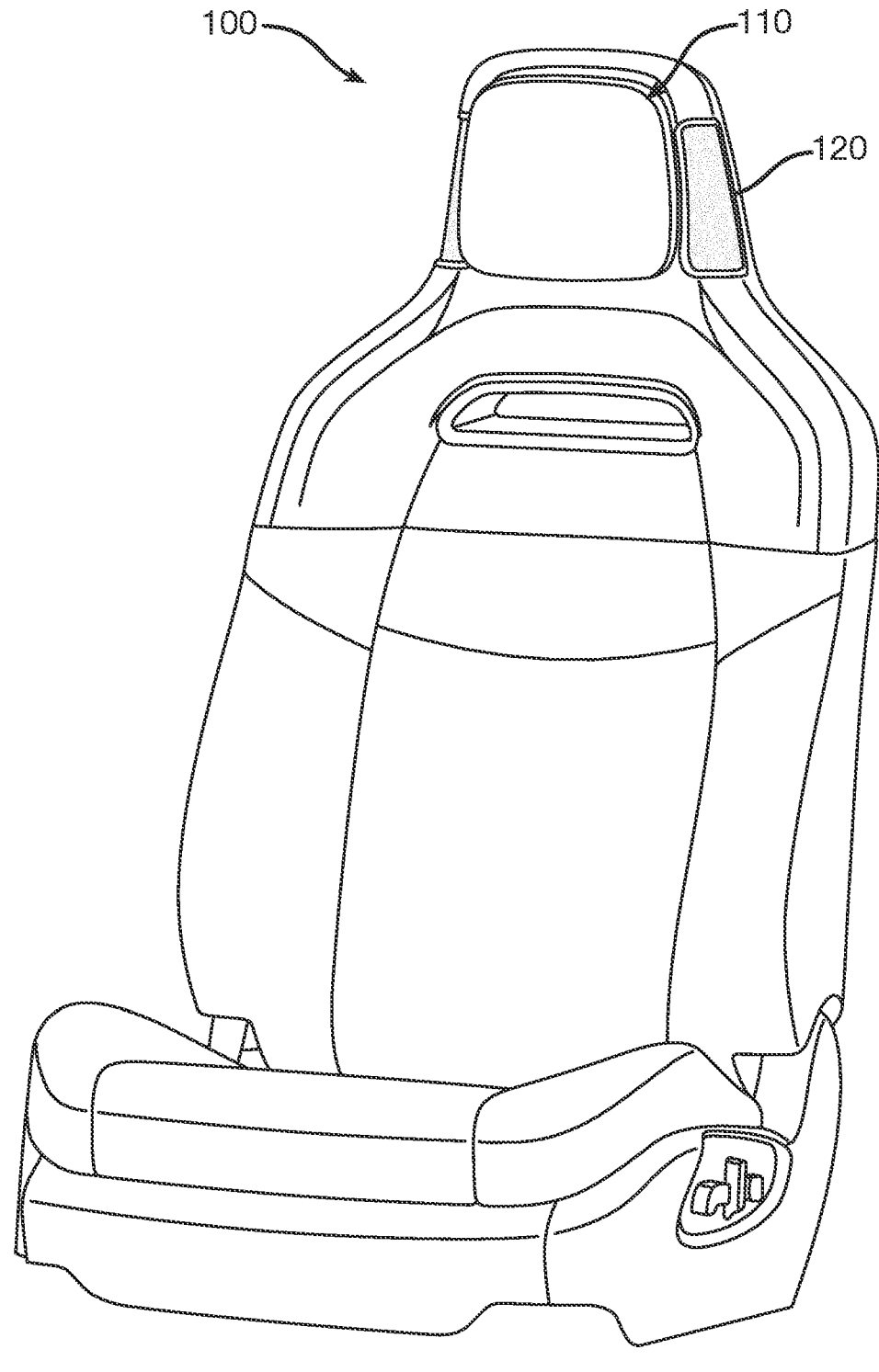
FIG. 1 is a perspective view of a seat having a headrest in accord with examples disclosed.
Figure 2:
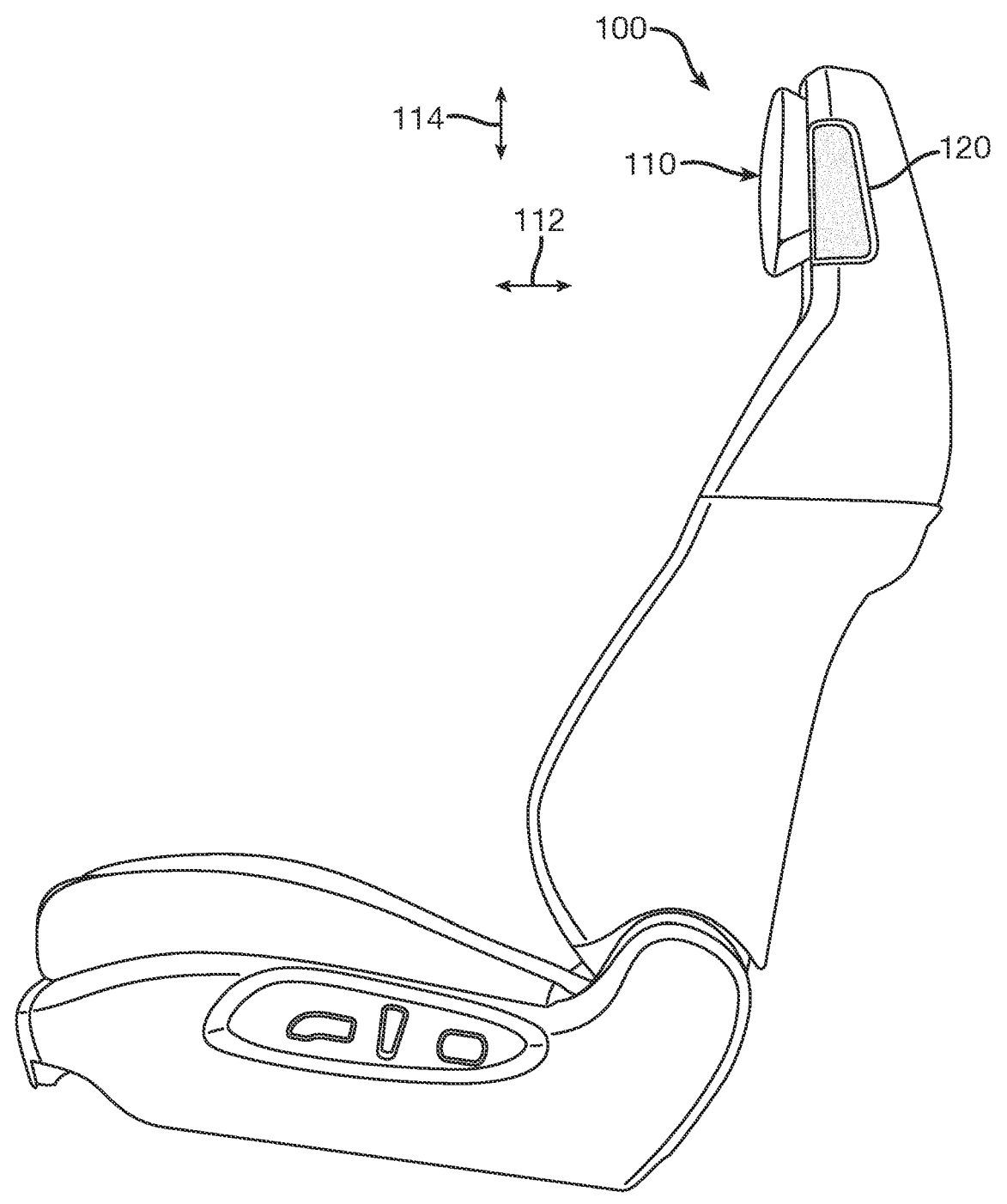
FIG. 2 is a side view of the seat of FIG. 1.
Figure 3:
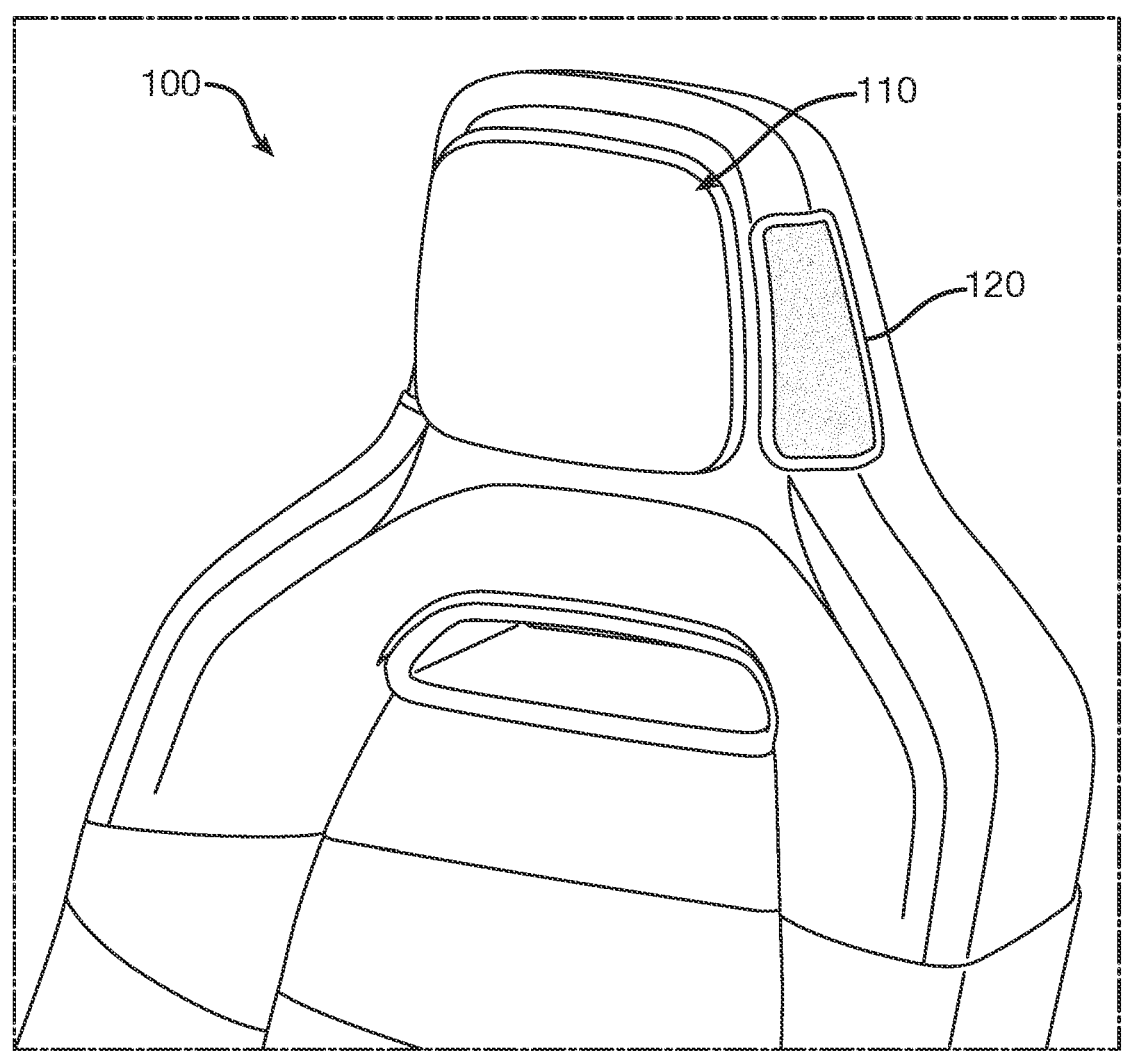
FIG. 3 is a close-up perspective view of the headrest portion of the seat of FIG. 1.

Illustrated in FIGS. 1-3 are a perspective view, side view, and close-up perspective view, respectively, of a seat that includes an example headrest 100 having an adjustable surface 110 positioned to be adjacent an occupant's head when the seat is occupied. The headrest 100 also includes at least one acoustic opening 120 coupled to an acoustic transducer (not shown) to provide acoustic signals to the occupant. In various examples, the headrest 100 may have two or more acoustic openings 120 to accommodate, e.g., left and right signals, high-mid-low frequencies, or combinations of these. In some examples, only a single acoustic opening 120 may be present.

Various examples may include an acoustic transducer coupled to each acoustic opening 120. Of which, in various examples, an acoustic transducer may be coupled to multiple of the acoustic openings 120 and/or an acoustic opening 120 may be coupled to multiple acoustic transducers, to accommodate varying system requirements and/or performance characteristics. Various examples may include an acoustic channel that provides a conduit from an acoustic transducer to the acoustic opening 120. In certain examples the acoustic opening 120 may be associated with the adjustable surface 110 such that the acoustic opening moves with the adjustable surface 110. In such examples, an acoustic conduit may be adjustable and expand, contract, or shift with movement of the adjustable surface 110. In various examples the acoustic opening 120 may be associated with other portions of the seat or headrest (as shown) and remains fixed when the adjustable surface 110 is moved. In some examples, an acoustic transducer may be positioned very close to the acoustic opening 120, without a discernible acoustic conduit and, accordingly, the acoustic opening 120 may be substantially indistinguishable from the acoustic transducer itself, e.g., an acoustic transducer may be mounted in or at the acoustic opening 120.

FIG. 2 further illustrates that the surface 110 is adjustable along a first axis 112, e.g., horizontal or front-rear, and a second axis 114, e.g., vertical or up-down. References to horizontal, vertical, forward, rearward, up, down, and the like are relative to a headrest in a nominal orientation, such as a typical orientation in a vehicle with a driver, passenger, etc. In various examples a seat or a headrest in accord with those herein may be oriented differently, temporarily or permanently, such as in an aircraft, amusement ride, etc.

Placement or position of the adjustable surface has an acoustic effect on various acoustic signals emanating from the acoustic opening 120, such as by varying degrees of shadowing around edge(s) of the adjustable surface 110, between the acoustic opening 120 and an occupant's ear(s). In certain examples in which the acoustic opening 120 is associated with the adjustable surface 110, and wherein an acoustic conduit is also adjustable, placement or position of the adjustable surface 110 may alter the acoustic properties of the acoustic conduit, such as by elongating, shortening, or distorting a shape of the acoustic conduit.

Various examples detect a position of the adjustable surface 110 and adjust an audio or acoustic processing based on the detected position, to account for changing relative positions between an expected ear position and the acoustic opening 120, changing relative positions between the adjustable surface 110 and the acoustic opening 120, changing acoustic properties of an acoustic conduit, and/or various other relative changes that may affect acoustic performance. For example, one or more sensors may indicate or detect a position of the adjustable surface 110 and a processor may adjust a signal processing configured to provide a driver signal to an acoustic transducer (an acoustic driver, loudspeaker). In some examples, a gain and/or an equalization processing may be adjusted in response to the detected position of the adjustable surface 110. In various examples, various phase and/or timing adjustments may be additionally or alternatively applied, such as to adjust to maintain an inter-aural phase, inter-aural timing, inter-aural gain, and the like.

In some examples, a physical characteristic of the headrest may be adjusted in response to the detected position of the adjustable surface 110. For example, an acoustic transducer may be physically adjusted, e.g., moved, angled, tilted, rotated, etc., and/or the acoustic opening 120 may be physically adjusted, e.g., size changed, angled, extended, retracted, etc. In some examples, such a physical characteristic may be performed by mechanical coupling between the adjustable surface and the other components to be adjusted. In some examples, a controller and actuators may perform such mechanical adjustments.

Figure 4:
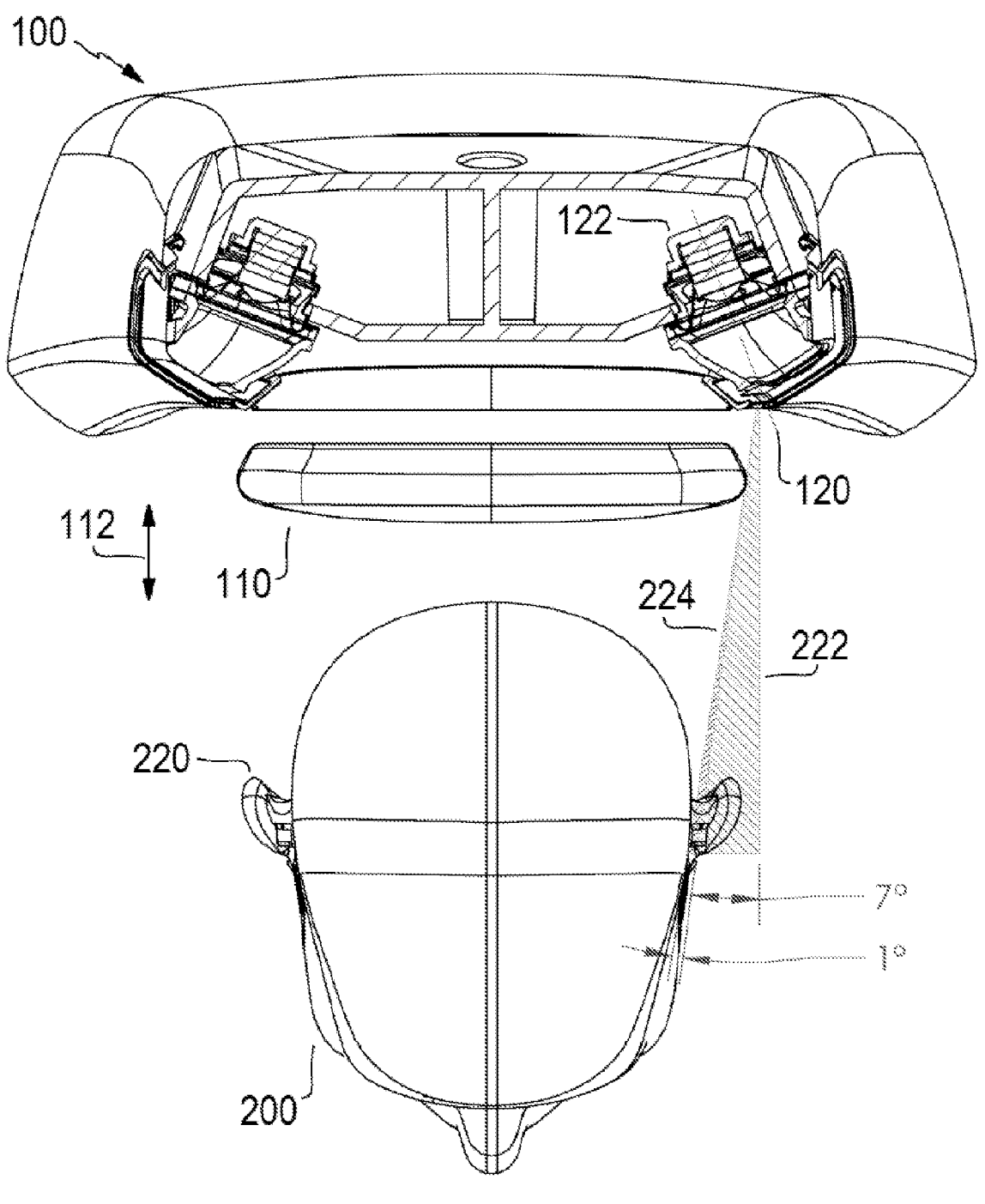
FIG. 4 is a schematic top view of an example headrest having an adjustable surface in a nominal position.

FIG. 4 is a schematic diagram of a top view cross-section of the example headrest 100, illustrating the adjustable surface 110 in a nominal position relative to the horizontal axis 112. In this example, two acoustic transducers 122 are shown (e.g., mounted inside the headrest 100, in an enclosure in various examples). An occupant's head 200 is illustrated, along with approximate positions of the occupant's ears 220. In various examples, and in various positions of the adjustable surface 110, acoustic energy is emitted from each of the acoustic openings 120 and distributed outward, toward the occupant's head 200. In various examples, a distribution angle 222 may be represented as the angle measured from straight forward (e.g., from a center point or other reference point of the acoustic opening 120) and extending toward a central axis of the headrest, until a direction in which the acoustic energy is interfered with by a structure of the adjustable surface 110.

In some positions of the adjustable surface 110 (and for a given position of a given occupant), the occupant's ear 220 may fall entirely within the distribution angle 222. Accordingly, any acoustic shadowing of the adjustable surface 110 may have a relatively minor effect on the acoustic energy reaching the occupant's ear 220 from a given one of the acoustic openings 120. As illustrated in FIG. 4, however, the occupant's ear 220 is at least partially shadowed by a structure of the adjustable surface 110, accordingly defining a shadow angle 224.

Figure 5:
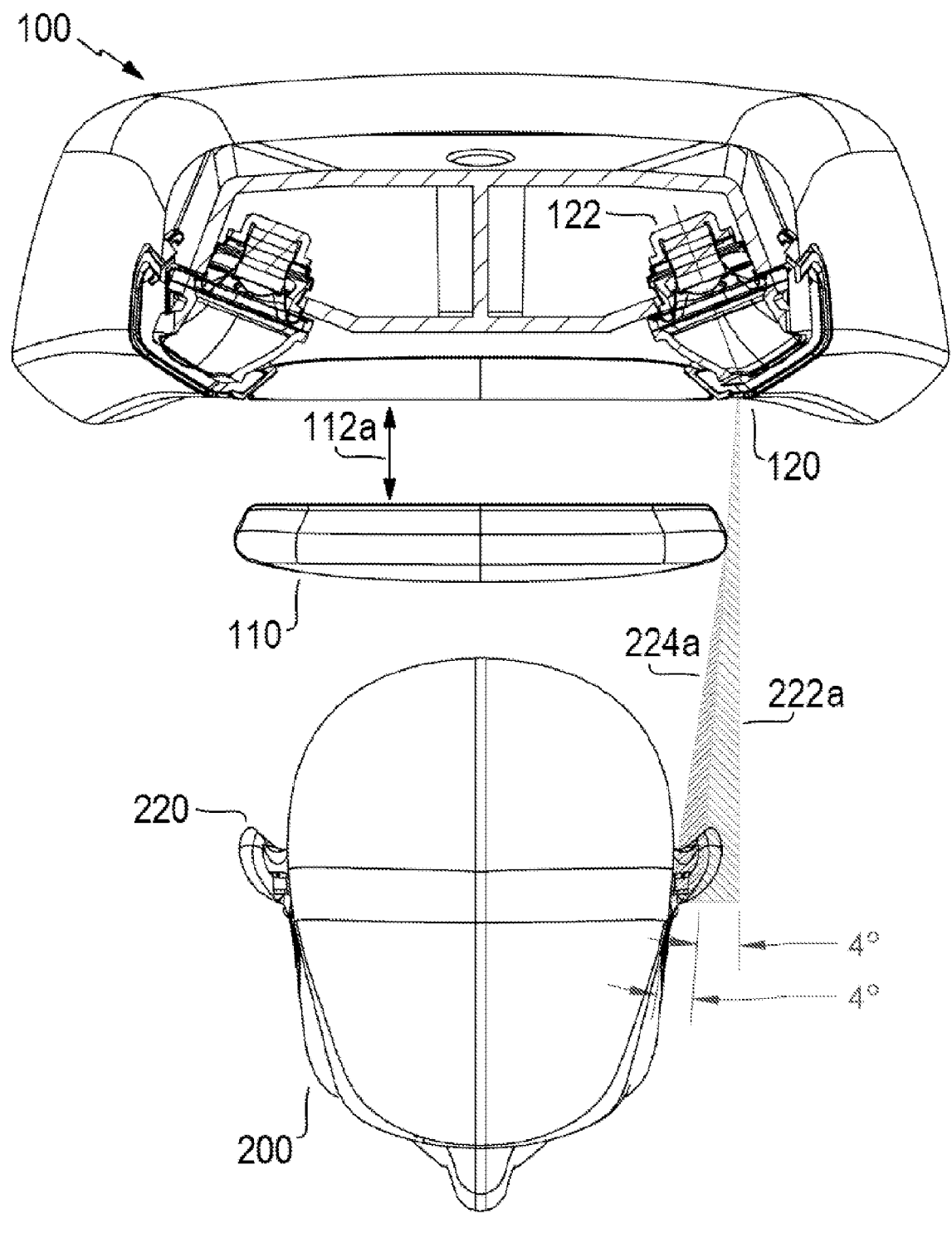
FIG. 5 is a schematic top view of the headrest of FIG. 4 with the adjustable surface in a forward position.

With reference to FIG. 5 there is illustrated the example headrest 100, similarly to FIG. 4, except with the adjustable surface 110 in a more forward position relative to the horizontal axis. Accordingly, a distance 112a may indicate an extent of the forward positioning of the adjustable surface 110. With the adjustable surface 110 in this forward position, the adjustable surface 110 may cause a larger shadow angle 224a and an accordant smaller distribution angle 222a, for a given occupant in the same position (relative to the adjustable surface 110) as that shown in FIG. 4.

Figure 6:
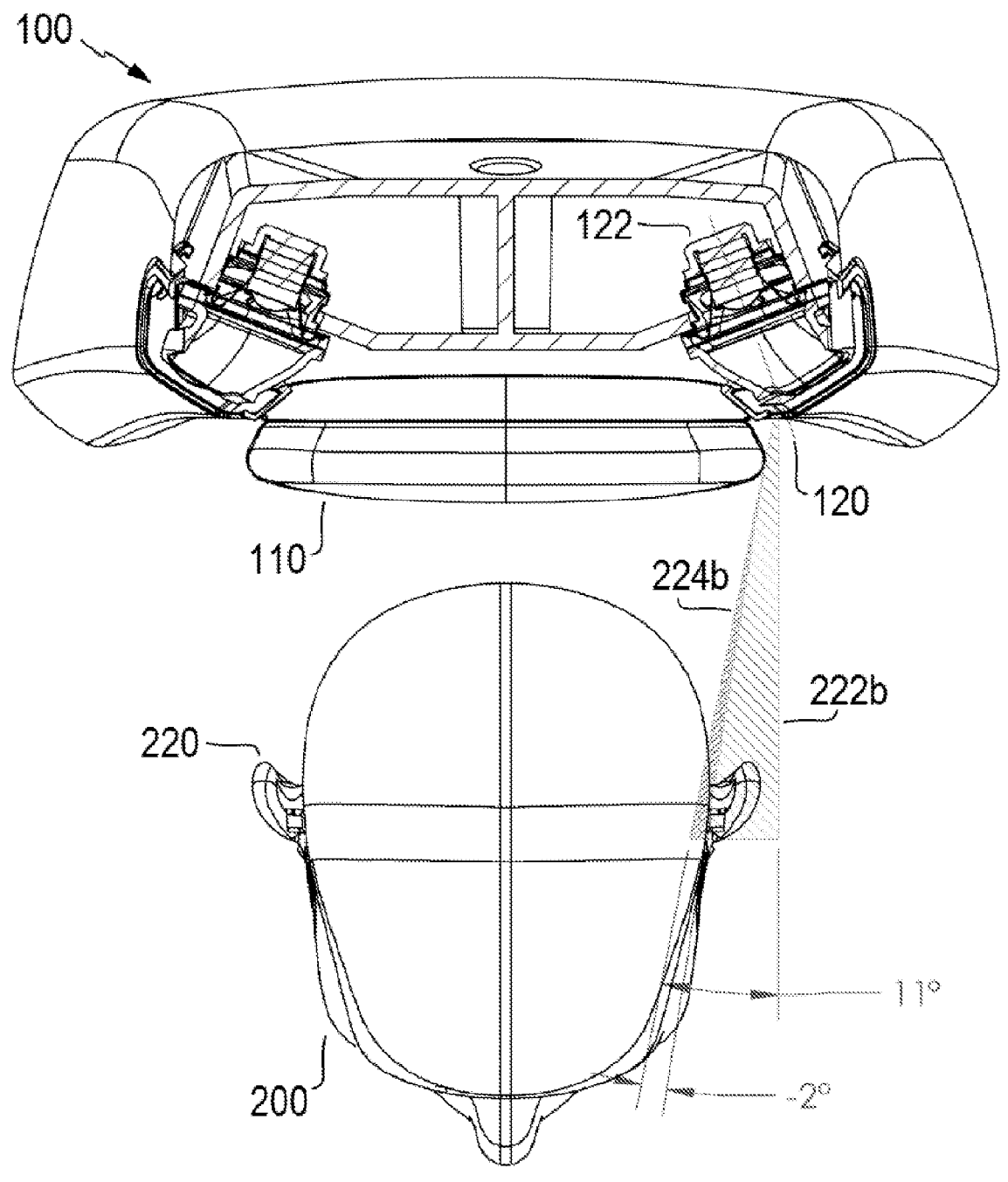
FIG. 6 is a schematic top view of the headrest of FIG. 4 with the adjustable surface in a rearward position.

With reference to FIG. 6 there is illustrated the example headrest 100, similarly to FIGS. 4 & 5, except with the adjustable surface 110 in a more rearward position relative to the horizontal axis. In this case, again for a given occupant in the same position (relative to the adjustable surface 110), the distribution angle 222b fully covers the occupant's ear 220, and the shadow angle 224b is accordingly negative, e.g., the occupant's ear 220 is outside of the shadowed region).

With continued reference to all of FIGS. 4-6 that illustrate varying horizontal positions of the adjustable surface 110, each of the FIGS. 4-6 may have a differing acoustic transfer function from the acoustic opening 120 to the occupant's ear 220. Otherwise stated, each may have a differing transfer function from the acoustic transducer 122 to the occupant's ear 220, which may be an acoustic transfer function, or may include the acoustic transducer 122's transfer function, or other signal transfer portions of an audio system that provide a driver signal to the acoustic transducer 122.

For a given occupant in a given position relative to the adjustable surface 110, the difference in transfer functions between each of FIGS. 4-6 is caused (at least in part) by the distance to the occupant's ear(s) 220 and the position of the adjustable surface 110 varying the shadowed region created by the structure of the adjustable surface 110.

In various examples, an audio system and/or a processor may adjust a driver signal (e.g., various 'tuning' changes, including equalization, gain, phase, timing, and/or the like) provided to the acoustic transducer 122 to accommodate and/or at least partially compensate for the changing transfer function based upon the position of the adjustable surface 110. In various examples, various sensors may be included to detect the position of the adjustable surface 110, and the audio system or other processor may receive signal(s) from such sensors, the signal(s) representative of the detected position.

The various angular dimensions illustrated on each of the FIGS. 4-6 are merely representative of one example headrest 100 for a given occupant's head position, and are not intended to be limiting.

Figure 7:
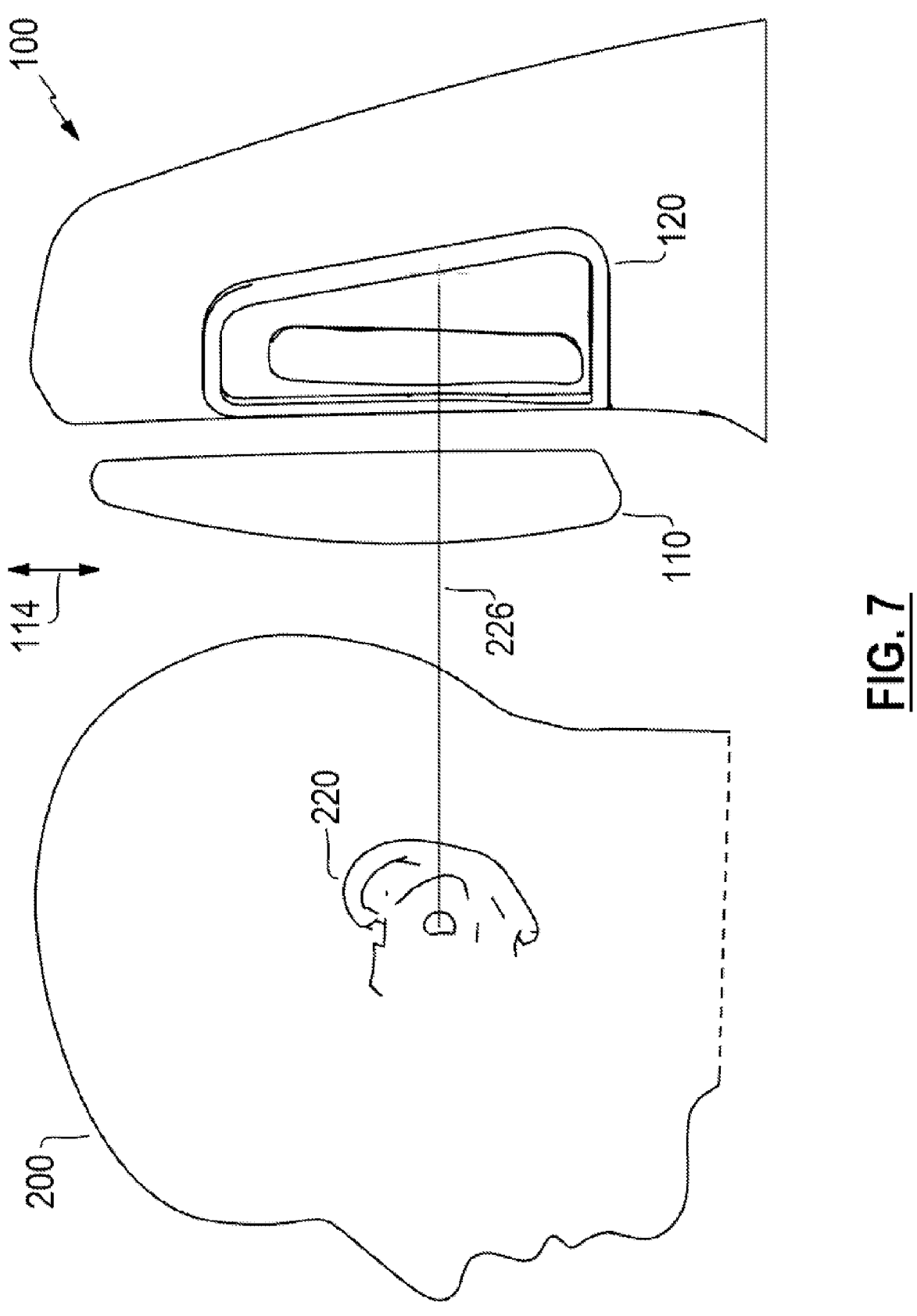
FIG. 7 is a schematic side view of the headrest of FIG. 4 with the adjustable surface in a nominal position.

FIG. 7 is a schematic diagram of a side view cross-section of the example headrest 100, illustrating the adjustable surface 110 in a nominal position relative to the vertical axis 114. During operation, acoustic energy is emitted from the acoustic opening 120 (e.g., left side shown), and an occupant's ear 220 may have a vertical alignment 226 relative to a reference point of the acoustic opening 120. For example, a central position of the acoustic opening 120 may be configured to align nearly or substantially level, horizontally, with an occupant's ear 220 for the nominal position of the adjustable surface 110, which may be intended to properly align with a nominal occupant's head 200. In various examples, a nominal position may comprise other angles of alignment 226.

Figure 8:
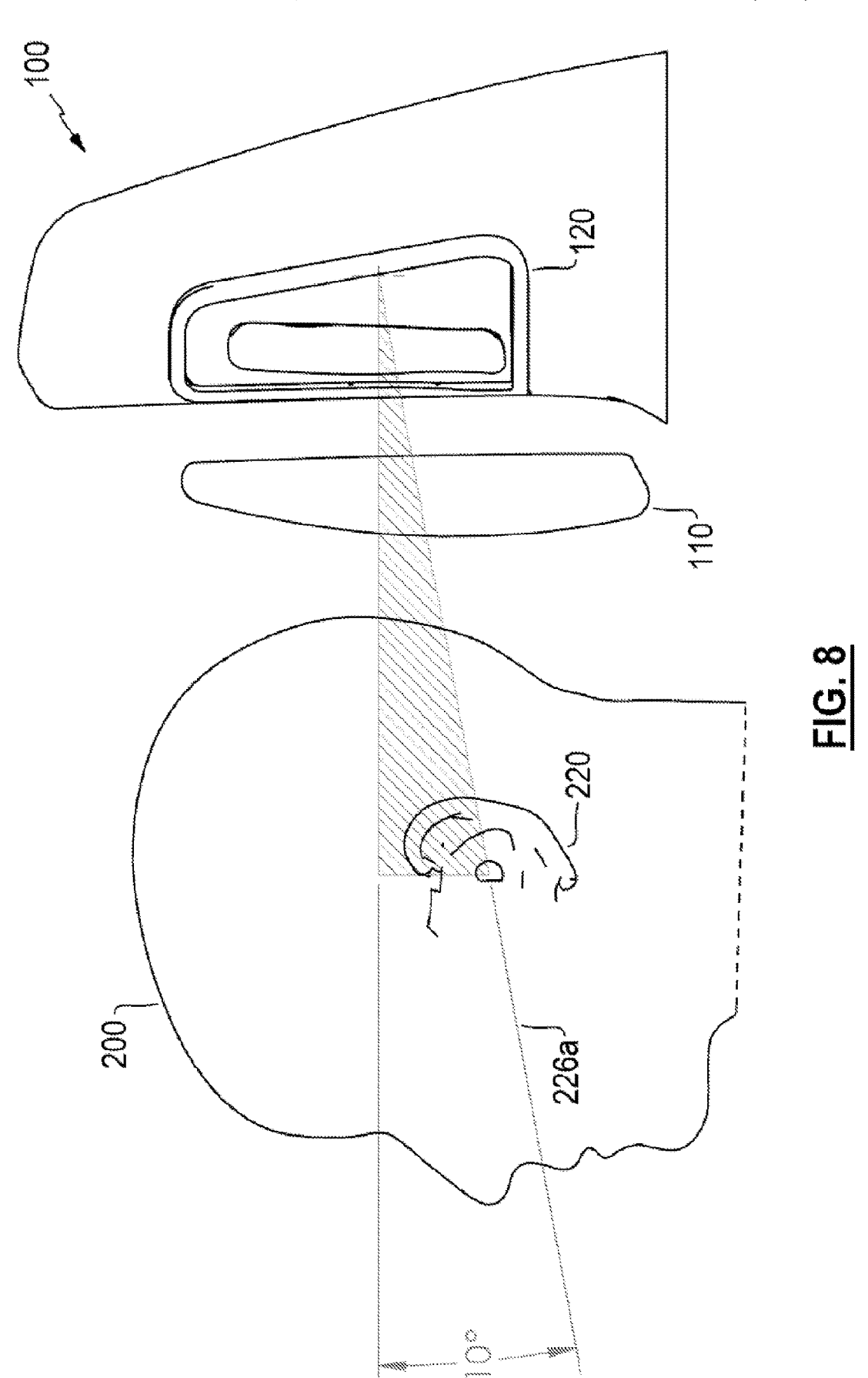
FIG. 8 is a schematic side view of the headrest of FIG. 4 with the adjustable surface in a raised position.

Various occupant's may be of varying heights and, accordingly, may adjust the vertical position of the adjustable surface 110. As illustrated in FIG. 8, a shorter occupant 200 may position the adjustable surface 110 in a lower position than, e.g., relative to, that shown in FIG. 7, such that the alignment 226a represents the occupant's ear 220 being lower than that of the nominal position, relative to the acoustic opening 120.

Figure 9:
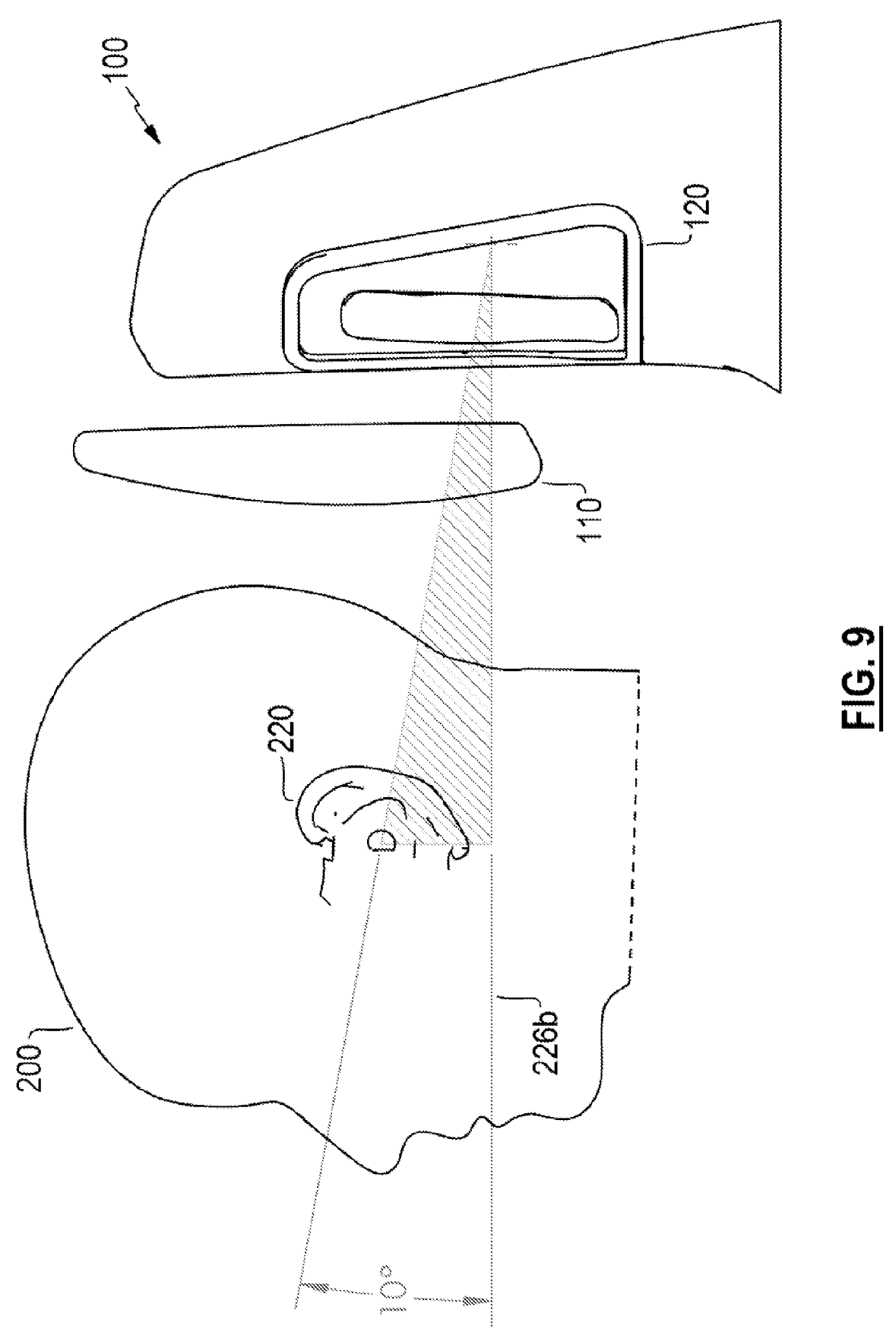
FIG. 9 is a schematic side view of the headrest of FIG. 4 with the adjustable surface in a lowered position.

Further, and with reference to FIG. 9, a taller occupant 200 may position the adjustable surface 110 in a higher position than, e.g., relative to, that shown in FIG. 7, such that the alignment 226b represents the occupant's ear 220 being higher than that of the nominal position, relative to the acoustic opening 120.

With continued reference to all of FIGS. 7-9 that illustrate varying vertical positions of the adjustable surface 110, each of the FIGS. 7-9 may have a differing acoustic transfer function from the acoustic opening 120 to the occupant's ear 220. As with the varying horizontal positions of the adjustable surface 110, each may have a differing transfer function from the acoustic transducer 122 to the occupant's ear 220, which may be an acoustic transfer function, or may include the acoustic transducer 122's transfer function, or other signal transfer portions of an audio system that provide a driver signal to the acoustic transducer 122. A difference in transfer functions between each of FIGS. 7-9 is caused (at least in part) by the position of the occupant's ear(s) 220 and the varying position of the adjustable surface 110, each of which may represent a change relative to the radiation pattern of acoustic energy emitted from the acoustic opening 120, and may also represent a changing distance to the occupant's ear(s) 220. Further, the adjustable surface 110 may cause varying shadowed regions, similar to those discussed with respect to FIGS. 4-6, at varying vertical positions, as created by the structure of the adjustable surface 110, for example.

In various examples, an audio system and/or a processor may adjust a driver signal (e.g., various 'tuning' changes, including equalization, gain, phase, timing, and/or the like) provided to the acoustic transducer 122 to accommodate and/or at least partially compensate for the changing transfer function based upon the position of the adjustable surface 110. For example, adjustments may be made to overcome off-axis high frequency loss (or gain). In various examples, various sensors may be included to detect the position of the adjustable surface 110, which may be the same or similar sensors as discussed previously with respect to FIGS. 4-6, and the audio system or other processor may receive signal (s) from such sensors, the signal(s) representative of the detected position.

In various examples, some positions of the adjustable surface 110 may provide various unobstructed acoustic paths from the acoustic opening 120 to the ear 220. For example, and with reference to FIG. 9, the lowest portions of the acoustic opening 120 may have an unobstructed acoustic path to the ear 220. Accordingly, various positions of the adjustable surface 110 may create drastically different transfer functions that may be accommodated by a processor to adjust a driver signal in response thereto.

In various examples, a detected vertical position of the adjustable surface 110 may be representative of a horizontal alignment and distance to the occupant's ear(s) 220. In some examples, such may also be indicative of a distance to other surfaces, such as a roof liner of an automobile, and a driver signal may further be adjusted to accommodate and/or partially compensate for a varying acoustic effect of such differing distance(s) to other surfaces.

The various angular alignments illustrated in each of the figures are merely representative of one example headrest 100 for a nominal occupant's head position relative to the adjustable surface 110, and are not intended to be limiting.

Figure 10:
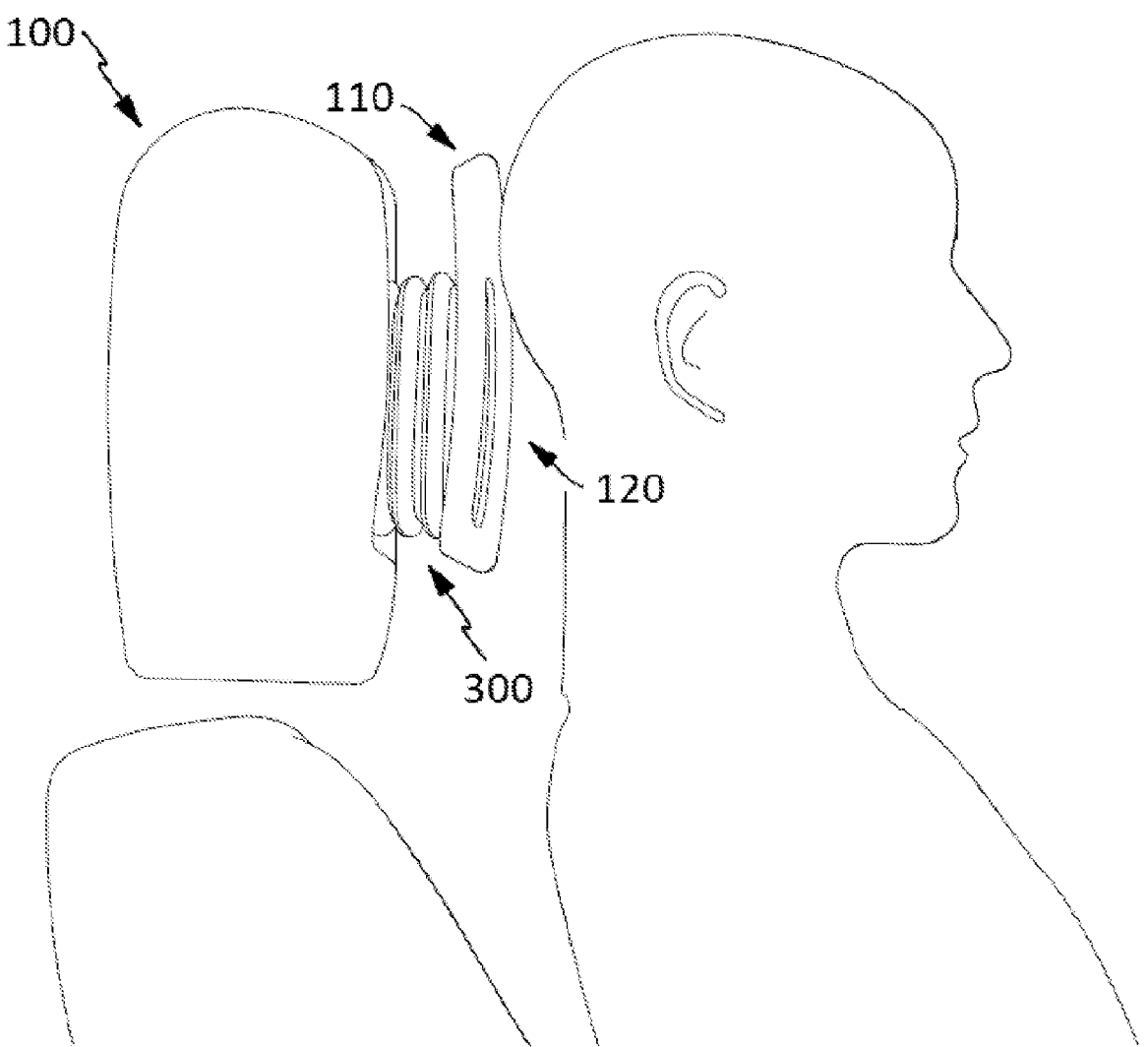
FIG. 10 is a schematic side view of another example headrest having an adjustable surface in a nominal position.
Figure 11:
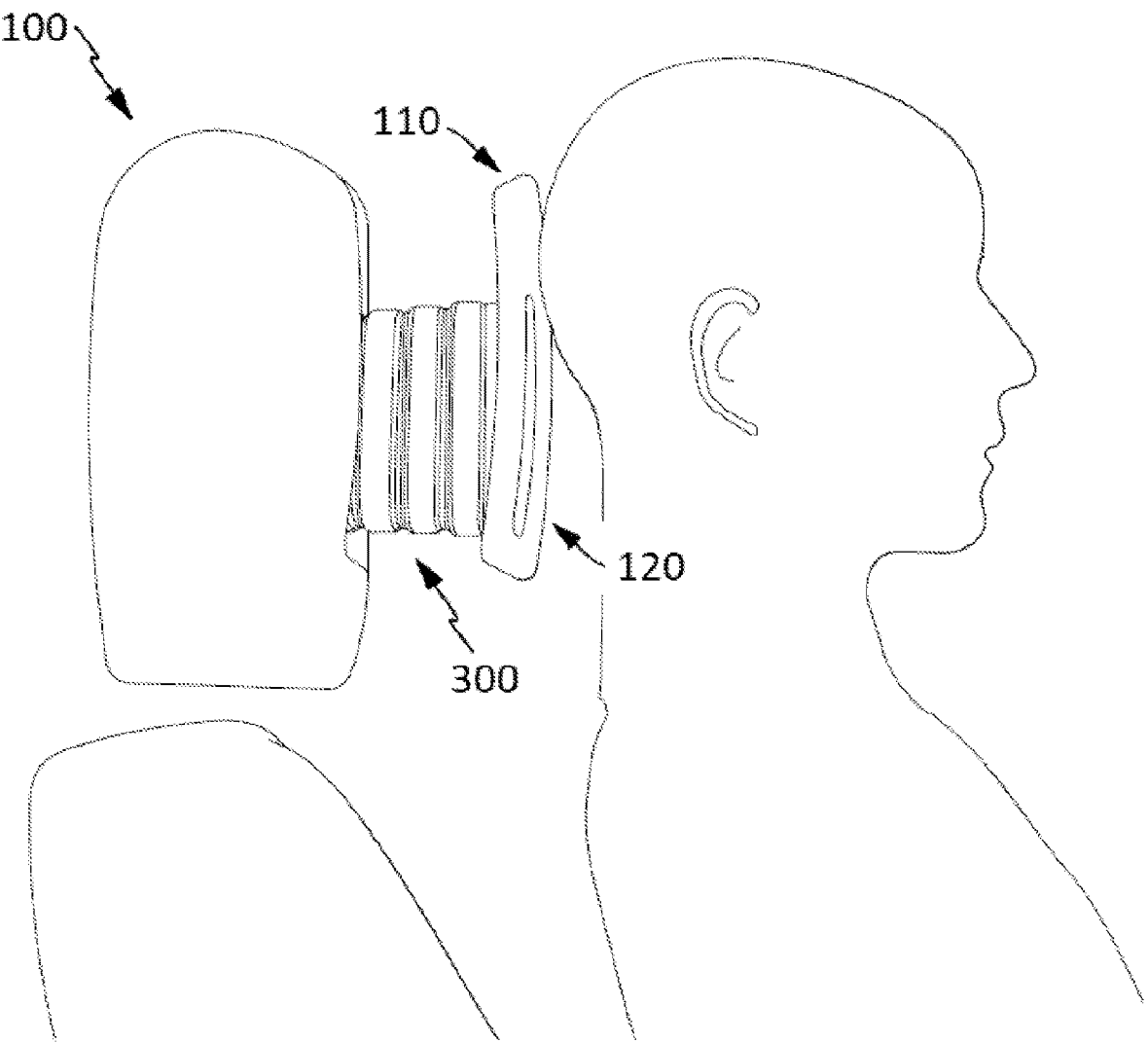
FIG. 11 is a schematic side view of the headrest of FIG. 10 with the adjustable surface in a forward position.
Figure 12:
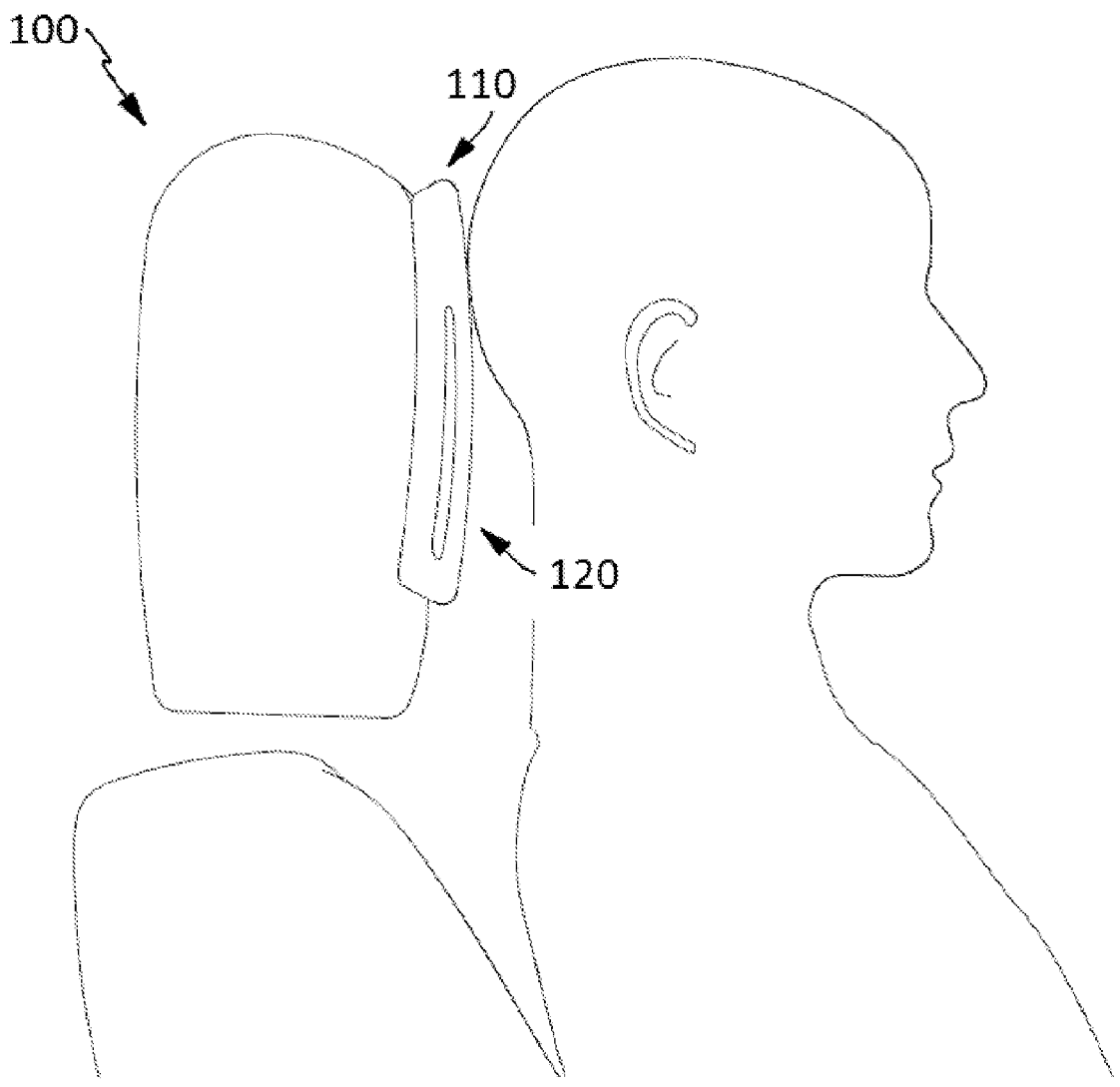
FIG. 12 is a schematic side view of the headrest of FIG. 10 with the adjustable surface in a rearward position.

In at least one example, an alternate form of a headrest 100 is illustrated, with reference to FIGS. 10-12. The headrest 100 of FIGS. 10-12 may be similar to that of FIGS. 1-9 but has the acoustic opening 120 associated with the adjustable surface 110. In the example headrest 100 of FIGS. 10-12, an acoustic transducer (not shown) may be installed in another portion of the headrest 100 or another portion of the seat (or any suitable location) and an acoustic conduit 300 may be provided to carry or convey acoustic energy from the acoustic transducer to the acoustic opening 120.

The acoustic conduit may be adjustable to accommodate varying positions of the adjustable surface 110. For example, and as illustrated in FIGS. 10-12, the acoustic conduit 300 may have an accordion style that allows the acoustic conduit to compress (shorten) or elongate (lengthen). FIG. 10 illustrates the acoustic conduit 300 in a nominal (medium length) position, while FIG. 11 illustrates the acoustic conduit 300 in an elongated (lengthened) position and FIG. 12 illustrates the acoustic conduit 300 in a compressed (shortened) position (such that the acoustic conduit 300 is not visible in this example). In various examples, the acoustic conduit 300 may be flexible in other dimensions, such as to accommodate movement of the adjustable surface 110 up and down as well as forward and back. In various examples, the acoustic conduit 300 may be telescoping, flexible, elastic, and/or comprise any other mechanical or physical properties to allow the acoustic conduit 300 to accommodate relative positioning of the adjustable surface 110.

As discussed above with respect to FIGS. 1-9, various examples may detect a position of the adjustable surface 110 of FIGS. 10-12 and may make any signal processing and/or physical/mechanical adjustments to accommodate one or more changing acoustic properties of the headrest system that includes the acoustic transducer, acoustic conduit 300, adjustable surface 110, and acoustic opening 120, variously in combination with an occupant and/or other features. Every aspect of the previous discussion regarding detecting position of the adjustable surface 110 of FIGS. 1-9 and making any adjustments or taking any actions in response thereto, may equally apply to that of the headrest 100 of FIGS. 10-12. In the interest of brevity, such detailed discussion is omitted herein as duplicative.

The various figures are merely schematic, and are illustrative of relative positions of components, such that, e.g., the adjustable surface 110, is shown in varying relative positions and without regard for a physical structure that may support the adjustable surface 110. In various examples, such a physical support structure may include a mechanically adjustable support, may contribute to variations in acoustic transfer function (which may be taken into account in adjusting a driver signal). Further, such a physical support structure may be operable by manual manipulation by a user or by a powered mechanism, which may further be controlled by user inputs or by a processor receiving sensor inputs, e.g., sensing an occupant's head position, or by various means.

Examples of the methods and apparatuses discussed herein are not limited in application to the details of construction and the arrangement of components set forth in the above descriptions or illustrated in the accompanying drawings. The methods and apparatuses are capable of implementation in other examples and of being practiced or of being carried out in various ways. Examples of specific implementations are provided herein for illustrative purposes only and are not intended to be limiting. In particular, functions, components, elements, and features discussed in connection with any one or more examples are not intended to be excluded from a similar role in any other examples.

Also, the phraseology and terminology used herein is for the purpose of description and should not be regarded as limiting. Any references to examples, components, elements, acts, or functions of the systems and methods herein referred to in the singular may also embrace embodiments including a plurality, and any references in plural to any example, component, element, act, or function herein may also embrace examples including only a singularity. Accordingly, references in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation, unless the context reasonably implies otherwise.

Having described above several aspects of at least one example, it is to be appreciated various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A headrest comprising:
   a substantially planar adjustable surface positioned to be proximate the back of an occupant's head when in use, the adjustable surface being linearly adjustable along at least one of a front-rear axis and an up-down axis relative to the headrest; and
   an acoustic opening associated with the adjustable surface and mechanically coupled via an acoustic conduit to an acoustic transducer, the acoustic conduit configured to change length and/or shape in response to the linear adjustment of the adjustable surface; and
   a processor configured to adjust a driver signal provided to the acoustic transducer based on a position of the adjustable surface, including compensating for changes in acoustic properties of the acoustic conduit caused by displacement of the adjustable surface.

2. The headrest of claim 1 further comprising a sensor configured to detect the position of the adjustable surface.

3. The headrest of claim 1 wherein the processor is configured to adjust the driver signal to compensate at least in part for a shadow region between the acoustic opening and the ear, the shadow region varying with the position of the adjustable surface.

4. The headrest of claim 1 further comprising the acoustic transducer.

5. The headrest of claim 1, wherein the acoustic conduit comprises an accordion-style bellows or telescoping segment configured to elongate and compress in response to the planar surface's movement.

6. The headrest of claim 1, wherein the processor adjusts equalization, gain, phase, and/or timing parameters based on the detected displacement.

7. The headset of claim 1, wherein the processor adjusts phase and/or timing adjustments so as to maintain an inter-aural phase, inter-aural timing, and/or inter-aural gain.

8. The headset of claim 1, wherein the acoustic conduit is telescoping, flexible, or elastic.

9. An audio system comprising:

a headrest having a substantially planar adjustable surface positioned to be proximate the back of an occupant's head when in use, the surface being linearly adjustable along at least one of a front-rear axis and an up-down axis; and an acoustic opening associated with the adjustable surface and coupled to an acoustic transducer via an acoustic conduit that changes geometry responsive to displacement of the adjustable surface; and a processor configured to adjust a driver signal provided to the acoustic transducer based on a position of the adjustable surface, including compensating for changes in acoustic properties of the acoustic conduit caused by displacement of the adjustable surface.

10. The audio system of claim 9 further comprising a sensor configured to detect the position of the adjustable surface.

11. The audio system of claim 9, wherein the sensor detects both vertical and horizontal displacement and communicates the displacement to the processor.

12. A method of controlling an audio output of an audio headrest having a substantially planar adjustable surface positioned to be proximate the back of an occupant's head when in use, the method comprising:

detecting a linear displacement of the adjustable surface along at least one axis; and adjusting a driver signal provided to an acoustic transducer coupled to an acoustic opening associated with the adjustable surface via an acoustic conduit based on the detected position of the adjustable surface, including compensating for changes in acoustic properties of the acoustic conduit caused by displacement of the adjustable surface.

13. The method of claim 12, wherein adjusting the driver signal includes compensating for variation in the acoustic properties of the acoustic conduit caused by a change in length of the acoustic conduit.

\* \* \* \* \*